United States Patent
Hu et al.

(10) Patent No.: US 11,551,327 B2
(45) Date of Patent: *Jan. 10, 2023

(54) SYSTEM AND METHOD FOR ENERGY PROFILING ASYNCHRONOUS API CALLS

(71) Applicant: Purdue Research Foundation, West Lafayette, IN (US)

(72) Inventors: Yu Charlie Hu, West Lafayette, IN (US); Ning Ding, Santa Clara, CA (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/460,174

(22) Filed: Aug. 28, 2021

(65) Prior Publication Data
US 2021/0390655 A1    Dec. 16, 2021

Related U.S. Application Data

(63) Continuation of application No. 16/392,518, filed on Apr. 23, 2019, now Pat. No. 11,107,179.

(60) Provisional application No. 62/661,314, filed on Apr. 23, 2018.

(51) Int. Cl.
| | |
|---|---|
| *G06F 1/00* | (2006.01) |
| *G06F 11/30* | (2006.01) |
| *G06T 1/20* | (2006.01) |
| *G06F 9/451* | (2018.01) |
| *G06F 1/28* | (2006.01) |

(52) U.S. Cl.
CPC ............... *G06T 1/20* (2013.01); *G06F 1/28* (2013.01); *G06F 9/451* (2018.02); *G06F 11/3024* (2013.01); *G06F 11/3058* (2013.01); *G06T 2200/24* (2013.01)

(58) Field of Classification Search
CPC .......... G06F 1/28; G06F 9/451; G06F 11/302; G06F 11/3024; G06F 11/3058; G06F 11/3062; G06F 2201/865; G06T 1/20; G06T 2200/24
See application file for complete search history.

(56) References Cited

U.S. PATENT DOCUMENTS

| | | | | |
|---|---|---|---|---|
| 8,972,572 B2* | 3/2015 | Gerber | ............... | H04W 52/0232 |
| | | | | 709/224 |
| 2013/0268257 A1* | 10/2013 | Hu | ........................... | G06F 30/20 |
| | | | | 703/22 |
| 2016/0209900 A1* | 7/2016 | Blayvas | ................. | G06F 1/3228 |

* cited by examiner

*Primary Examiner* — Nitin C Patel
(74) *Attorney, Agent, or Firm* — Piroozi-IP, LLC

(57) ABSTRACT

A method for profiling energy usage of invoking an application programming interface (API) by an application in a computing device. The method includes obtaining source code for the API, modifying each class by adding a callback function identifier field that is initiated to a unique value upon instantiation of each object that belongs to the class, identifying each location in the source code that posts the callback function for asynchronous execution by enqueueing each object instantiated from the class containing the callback function into the system callback queue, modifying the source code to log the callback function identifier of object at the location that dequeues objects from the system callback queue, modifying source code by adding two system logging function calls to log the callback function identifier of the dequeued object before and after executing the callback function, executing the application, and performing energy accounting of the asynchronous API calls.

18 Claims, 6 Drawing Sheets

SYSTEM AND METHOD FOR ENERGY PROFILING ASYNCHRONOUS API CALLS

CROSS-REFERENCE TO RELATED APPLICATIONS

The present patent application is a continuation of a U.S. Non-provisional patent application Ser. No. 16/392,518, filed Apr. 23, 2019, now U.S. Pat. No. 11,107,179 to Hu et al., issued on Aug. 31, 2021 which is titled "SYSTEM AND METHOD FOR ENERGY PROFILING ASYNCHRONOUS API CALLS"; which is related to a U.S. Non-provisional patent application Ser. No. 16/853,709, filed Apr. 20, 2020, now U.S. Pat. No. 11,200,637 to Hu et al., issued on Dec. 14, 2021 which is titled "GRAPHICS ENERGY PROFILING SYSTEM AND METHOD"; and to U.S. Provisional Patent Application Ser. No. 62/661,314, filed Apr. 23, 2018, the contents of each of which are hereby incorporated by reference in their entireties into the present disclosure.

TECHNICAL FIELD

The present application relates to energy profiling of application programming interfaces (APIs), and in particular related to a method for determining energy usage for asynchronous calling of APIs and functions therein.

BACKGROUND

Modern mobile devices use APIs to streamline programming. An API is a set of functions and procedures that generate simple to complex functions that access the features and/or data of a processor. In doing so, the APIs cost energy. Some APIs use substantial energy even in normal processing. On the other hand, an API can be programmed with an energy bug that causes the API to use substantial amount of energy when no energy or only little energy should be used.

To complicate this challenge, APIs can be called asynchronously. This means that the functions asynchronously invoked by a plurality of APIs can be called without a clear accounting as to which API calls which function to an observer of energy usage. This asynchronous timing can be particularly problematic since it is almost impossible to debug energy usage when the sources of function calls are unknown.

Furthermore, the challenge of profiling energy consumption is even more complex when the APIs are multi-layered. That is an API can asynchronously call functions that in turn asynchronously call other functions, while other multi-layered APIs also call those same functions.

There is therefore an unmet need to determine energy usage of invocations of APIs that are single or multi-layered and which are called asynchronously.

SUMMARY

A method for profiling the energy usage of invoking an application programming interface (API) by an application in a computing device is disclosed. The method includes obtaining source code "A" for the API, identifying each class $C_i$ in the A for the API that contains a callback function $D_i$, and modifying each $C_i$ by adding a callback function identifier field that is initiated to a unique value $V_j$ upon instantiation of each object $O_j$ that belongs to class $C_i$. The method also includes identifying each location $E_k$ in the A that posts the callback function $D_i$ for asynchronous execution by enqueueing object $O_j$ instantiated from the $C_i$ containing the callback function $D_i$ into the system callback queue, modifying the A at location $E_k$ by adding a logging function call L to log the callback function identifier $V_j$ and the current call stack into the energy profiling log, and obtaining source code B in the operating system/framework that asynchronously executes any D passed from the API. Furthermore, the method includes identifying each location F in the B that invokes the callback function associated with any object dequeued from the system callback queue; modifying the B at the F by adding logging function calls L before and after the callback function invocation to log the callback function identifier $V_j$ of the dequeued object when we start and finish executing the callback function respectively to the energy profiling log, and executing the application thereby generating at least two threads, wherein the first thread executes the API call that posts the callback function $D_i$ and wherein the second thread, which can be the same as the first thread, dequeues the callback function $D_i$ and invokes the callback function $D_i$. In addition, the method includes determining the caller-caller relationship between the function in the API execution stack that posted each $D_i$ and the asynchronously invoked callback function by processing the logged callback ID and the call stack information in the energy profiling log, determining the energy usage of invoking the API call in thread 1, by monitoring activities of a processor, the processor operating any component that consumes power in the computing device in response to execution of the API, and determining the energy usage of invoking each callback function in thread 2, by monitoring activities of a processor, the processor operating any component that consumes power in the computing device in response to execution of the callback function. The method finally includes adding the energy usage of invoking every callback function in thread 2 to the energy usage of invoking the API thus determined, and attributing the combined energy to the API invocation.

DETAILED DESCRIPTION

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel method for determining energy usage of application programming interfaces (APIs) in modern mobile devices that are single or multi-layered and which are called asynchronously is described. The solution of the present disclosure provides improvements to modern day computers and computing devices.

Figure 1:
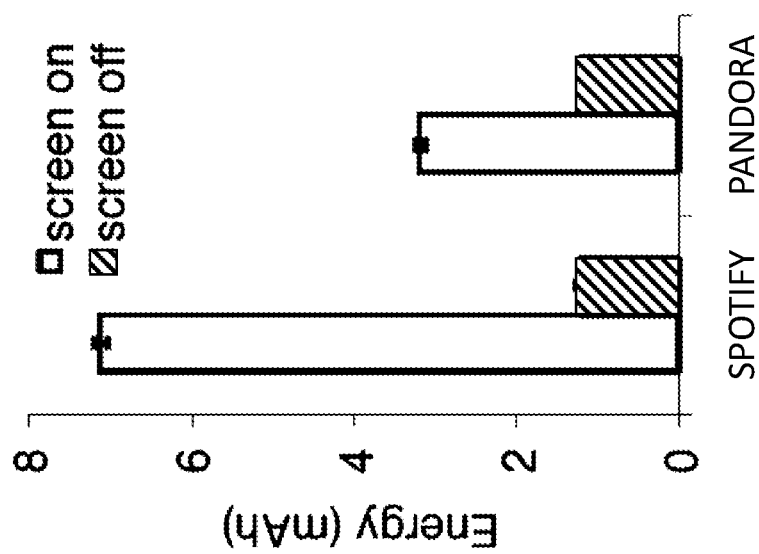
FIG. 1 is a bar graph showing energy usage for two popular apps with screen on/off.

To evidence the need to monitor energy of various applications (apps), reference is made to FIG. 1 which shows energy usage from two popular apps (SPOTIFY and PANDORA). We used a MONSOON power monitor to measure the energy consumption of 1-minute music streaming on a NEXUS 6 phone running ANDROID 5.1. For either app, we streamed a song from a random station. We performed two sets of experiments: with the music player activity running in the foreground, and with the music playback running in the background with screen-off. The phone used WiFi with excellent signal strength. We uninstalled all other apps on the phone and stopped all background activities such as account sync or backup. We chose songs of about 3 minutes long, and measured the energy drain from 60 s to 120 s, so that the song is fully buffered during the measurement period and there is little network activity. Each experiment is repeated 3 times. Since both apps have similar UI and perform the same functionality, we expected their energy drain to be comparable in both sets of experiments. With reference to FIG. 1, energy usage for the two apps (SPOTIFY and PANDORA) are shown while the two apps have similar energy drain with screen off, with screen-on, SPOTIFY consumes 123% more energy than PANDORA. This translates to excess energy usage when various graphics APIs are called. The energy usage in FIG. 1 provides proof that various APIs consume more energy than others. This difference in energy usage presents a challenge to developers who are always seeking to lower battery usage from energy-hungry apps.

To answer the aforementioned challenges, five distinct sub-challenges need to be overcome: (1) the profiling methodology must be able to cross the entire vertical system stack: some API processes involve traversing the entire vertical stack of all system layers from the app, the framework Java code and native code, the OpenGL ES library, and finally to the CPU or GPU or other device component; (2) the profiling methodology must be able to handle asynchronous API calls across all the system layers: the interactions between adjacent layers are highly asynchronous, e.g., through callback posting and invocation; (3) the profiling methodology must be able to handle batching: when multiple operations are batched in an asynchronous object oriented environment, the batching operation must be able to account (i) source thread of the object's invocation, (ii) log that object's invocation when initially invoked against the source thread, and then log that object as it is passed from the batch to a termination thread when the object exits the batch, e.g., multiple user interface (UI) updates issued by the app within the same display refresh interval (every 16.7 ms) are batched before asynchronously sent to the framework layer below; (4) the profiling methodology must also be able to handle CPUs/GPUs as a "Black-box" with closed-sourced drivers and internal command executions independent of the call stacks; and (5) track energy usage from the CPU/GPU when the APIs are called.

Figure 2:
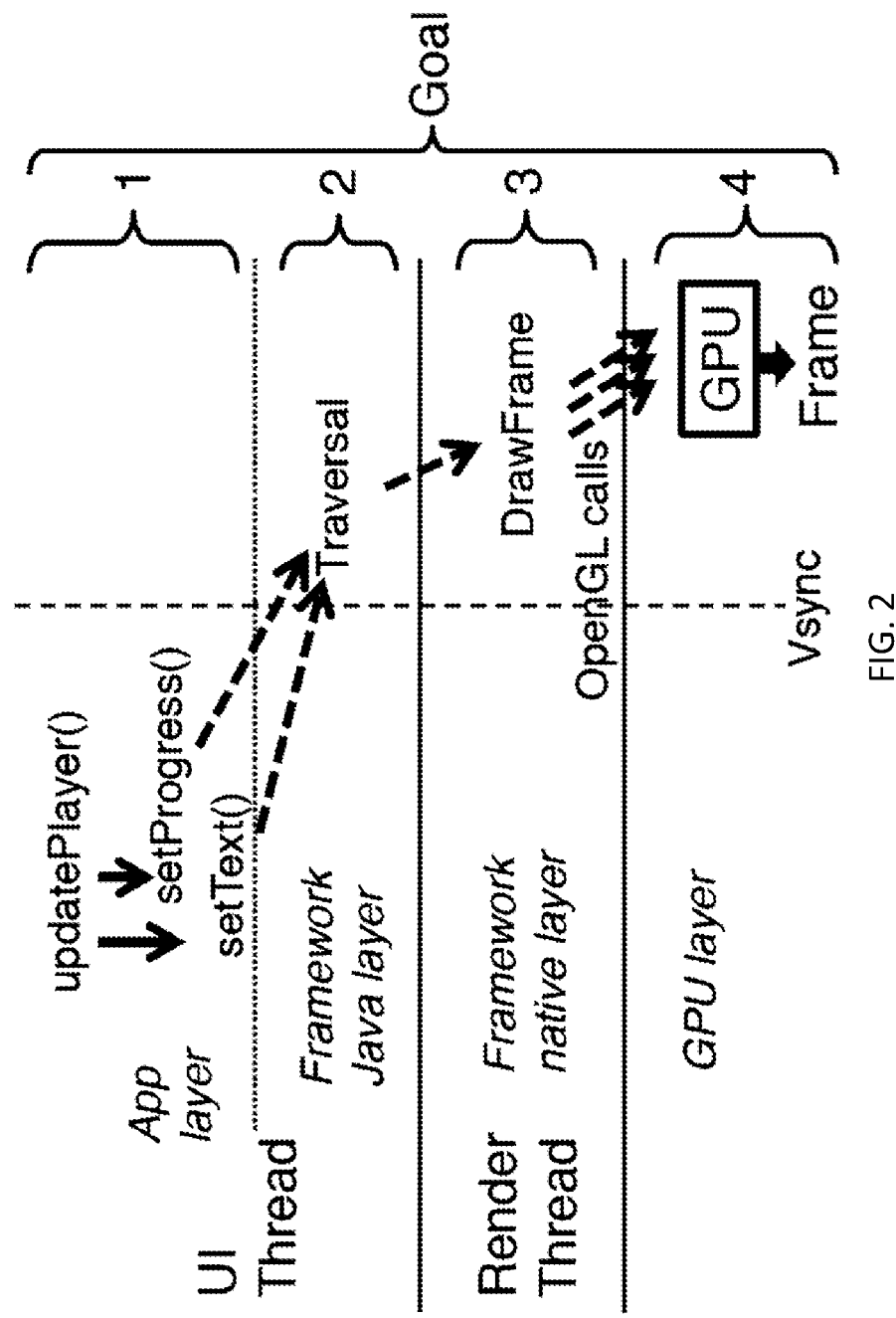
FIG. 2 is a schematic of a multi-layered application programming interface (API).

Referring to FIG. 2, an example of a multi-layer API is shown. This is a graphics user interface (UI) API which includes the App layer, the Framework Java layer, the Framework native layer, and finally the GPU layer. In each of these layers there may be functions that are repeatedly called, asynchronously, further exasperating the aforementioned challenge.

In answering these sub-challenges, the methodology of the present disclosure is configured to track asynchronous calls across all layers, track the energy drain of method invocations at each system layer as well as the black-box CPU/GPU, and account them to the responsible API calls. The method according to the present disclosure, also decodes the responsible API for invocation of objects into a batch. Thus the methodology according to the present disclosure enables developers to (1) understand the energy drain tradeoff of an API and its functionality, and (2) detect energy bugs in an API wherein output that is to be caused by calling the API does not change but where API calls nevertheless consumes energy.

To track the asynchronous dependencies across the stack layers the method of the present disclosure exploits an API ID-tracking technique to track the activities that causally depend on each API call across all layers.

In order to best describe the API ID-tracking of the present disclosure an analogy is made to USPS mail system. An any given point, a regional post office receives hundreds/thousands of mail from various senders to be delivered to various receivers. Suppose, none of the mail use stamps, but rather use a postage-accounting system. When each sender places a corresponding parcel in the mail box, that parcel receives a sender-unique identification number (ID) applied to it. The parcel is then placed in the mail system batching process to be processed (i.e., to be delivered to recipients). Once the parcel is placed into the mail system, the ID is logged. Then once the mail system delivers the parcel to the recipient, the ID is logged again. The logging of the ID at the initial sending and then at the receiving is for the purpose of accounting costs associated with mailing the parcel. In this simplified example, the mailing of the parcel is a class; the parcel is analogized to an object, the sender is analogized to a thread, and the mail batching process is analogized to a callback function queue in asynchronous programming, and the post office which takes out a parcel from the batching process and delivers the parcel is analogized to a second thread. The ID-tracking allows tracking of each parcel and enables the post office to charge the cost of delivering each parcel by the post office to the sender. However, in current asynchronous programming, no IDs are assigned to an object being placed in a callback function queue. Thus there is no accounting of that object from various perspectives, e.g., energy usage.

To further clarify an object-oriented situation, below is an example. Prior to providing the example, some definitions are provided. A class is a system-defined or a user-defined data structure. In other words, a class is a blueprint for the data structure. The blueprint provides what the class does to the data. A typical example provided in text books for object oriented programming is where the class is defined as a car (class car). The class car may have several data members: e.g., model, year of make, color-combination (outside-inside), and mileage. The class may also include function members, e.g., current value of a car which could be invoked to calculate the current value of the car based on the data members (e.g., year of make, color-combination, model, mileage, etc.). An object is a specific instant of the class. For example, the object instantiation of the class car may be "car my_car", in which my_car is the object of the class car. In the previous analogy to mailing, a class can be personal mail or business mail, in which each class can define a different data structure blueprint. For example, with personal mail, the data members within the class personal mail may include sender's name, receiver's name; whereas the class business mail may include Federal ID for sender, and Federal ID for receiver. A first thread may be associated with the process of mailing personal mail (thus the personal mail class) by one sender while a second thread may be the process of delivering a mail by the post office. With that we begin the example:

```
// we first review an example class that is defined by the operating system/framework:
//"Callback"
// this is what a class containing a callback function looks like, it has a run( ) method
// calling this callback.run( ) method will invoke the run function
class Callback( ) {
  void run( )
};
// Now let's say Thread1 posts a callback for Thread2 to run (analogy: in our mail
// example, a sender (thread 1) mails a parcel, and the postoffice (thread 2) takes the //
parcel out of the batching process, and delivers it, the code will be something like:
// Thread1:
void postCallback( ) {
  // create a callback with customized functionality
    Callback my_callback { //here we have an instantiation of the class Callback
      void run( ) {          // with an object my_callback
        printf("run the callback");
      }
    }
                            // A callback queue (batch process) is used here.
                            // callback_queue is a data structure shared between
                            // Thread1 and Thread2 (this is equivalent to a mail
                            // batch process such as a mailbox at a local post
                            // office)
    callback_queue.enqueue(my_callback);
                            // The object my_callback is thus queued into the
                            // callback_queue
}
// Now Thread 2:
void runCallback( ) {
  // Thread 2 pops out the object my_ callback from the callback function queue
  Callback callback_to_run = callback_queue.pop( );
  // this will finally run the callback function posted by Thread1
  callback_to_run.run( );
}
```

In the above Thread1-Thread2 interaction there is no explicit caller-callee relationship. In other words, the member function "run" within the class Callback is executed asynchronously and the associated energy cost is not ascertainable as to whether it was due to Thread 1 or Thread 2 (analogy to the mailing system, without ID-tracking, the accounting system would not be able to determine which sender should be charged for the cost of delivering a particular parcel incurred to the post office). This lack of accounting of energy consumption is a driving force behind the present disclosure.

To overcome this lack of energy accounting, the present disclosure provides a tracking mechanism. In order to do so, the class Callback is modified:

```
class Callback( ) {
  // the callback_id field is initialized to a unique unique ID upon
  instantiation of each
  // Callback object
  long callback_id = GLOBAL_CALLBACK_ID ++;
  void run( )
};
```

Now when the Callback is instantiated into an object, the callbacj_id field of the object is initialized to a unique ID (similar to initializing unique ID for a parcel when a sender creates the parcel).

```
// Thread 1:
void postCallback( ) {
  // create a Callback instance with customized functionality
  Callback my_callback {
    void run( ) {
      printf("run the callback");
    }
```

-continued

```
  }
  // log the callback_id of the object that is being enqueued into the
  callback queue and
  // the call stack
  // get_callstack( ) function will get current thread's call stack
  Log("callback_id=" + my_callback.callback_id + " generated by call
  stack " +
  get_callstack( ));
  // callback queue_is a data structure shared between Thread1 and
  Thread2
  callback_queue.enqueue (my_callback);
}
```

Next when the object my_callback is dequeued and hence passed on to Thread 2, the ID is logged again (analogy is to when the post office taking out a parcel from the batching process and performs the delivery operation as Thread 2, the parcel ID is logged before and after delivering the parcel).

```
// Thread 2:
void runCallback( ) {
  Callback callback_to_run = callback_queue.pop( );
  Log("start running callback_id=" + callback_to_run.callback_id);
  // this will run the customized callback function posted by Thread1
  callback_to_run.run( );
  Log("finish running callback_id=" + callback_to_run.callback_id);
}
```

Next the logs need to be post-processed to account for energy usage:

```
//Sample logs:
//Thread1:
callback_id=101 generated by call stack postCallback( )
// Thread2:
start running callback_id=101
// [other logging during running the callback, e.g. view rendering]
end running callback_id=101
```

Using the above methodology, the logged callback ID information can be processed to identify which object instantiation results in which function call asynchronously invoked thereby resolving the issue of asynchronous caller-callee tracking.

Figure 3:
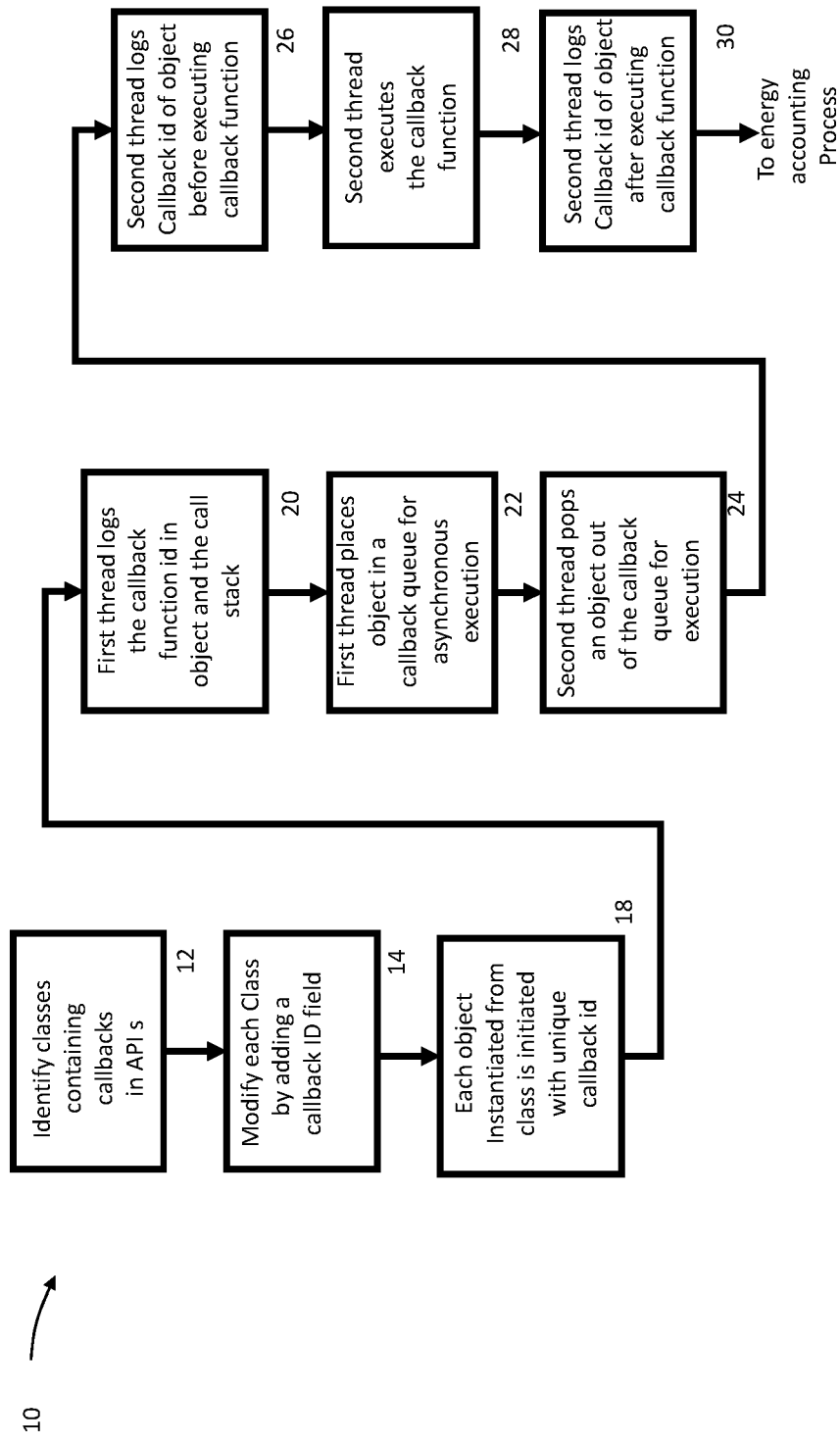
FIG. 3 is a block diagram of one exemplary method according to the present disclosure.

The technique described above can be applied to APIs with known source codes, whether of a single layer or a multi-layer variety (e.g., shown in FIG. 2). Referring to FIG. 3 a flowchart of the operations described above is provided.

Referring to FIG. 3, a process 10 for logging asynchronous function calls is provided. The process 10 begins by identifying classes in all APIs of interest (block 12). Then each class is modified by inserting a callback identifier field, that can be used to log asynchronous callback function calls triggered by an API call (block 14). Next, during application execution, the process 10 includes the step of instantiating an object of a class, which assigns a unique callback function identifier to the object (block 18). Next, the process 10 involves a first thread logging the callback function identifier of the object being placed in the system callback queue for asynchronous execution and the call stack at the moment (blocks 20). Next, the first thread places the object into the callback queue (block 22). Later, the object is popped out of the system callback queue for execution by a second thread (block 24). The second thread logs the callback function identifier of the object before executing the callback function (block 26), executes the callback function (block 28), and then logs the callback function identifier again after executing the callback function (block 30). The logging information is then used to perform energy accounting of the asynchronous API call during post-processing.

After the asynchronous tracking is accomplished, next the energy consumption of each callback function invocation and that of the synchronous part of the original API call are first independently estimated using energy profiling for synchronous function calls. The energy consumption of the caller is then added to that of the caller to generate the total energy for the asynchronous API call.

Measuring the battery drain of a synchronous function call during the execution of an application is challenging. The simple approach of using an external power meter can only measuring the total power draw of the phone; it cannot measure the energy drain of individual apps and services concurrently running on the phone. To measure the battery drain of a synchronous function call during the execution of an application, we use a hybrid power model that requires no modifications to the operating systems or the Android framework.

Power models for mobile devices in general and wireless components such as WiFi, 3G and LTE radios have been actively studied in recent years, and the proposed power models fall into two major categories.

The first category of power models known as utilization-based models for smartphones are based on the intuitive assumption that the utilization of a hardware component (e.g., NIC) corresponds to a certain power state and the change of utilization is what triggers the power state change of that component. Consequently, these models all use the utilization of a hardware component as the "trigger" in modeling power states and state transitions. Such models thus do not capture power behavior of modern wireless components that do not lead to active utilization such as the promotion and tail power behavior of 3G and LTE, and thus can incur high modeling error.

The second category of power models capture the non-utilization based power behavior of wireless components using finite state machines (FSMs), e.g., WiFi, 3G and for LTE network interfaces. In a nut shell, the built-in state machine of the wireless radio, e.g., the RRC states and transitions in LTE, is reverse-engineered and represented in a finite state machine that annotates each power state or transition with measured power draw and duration values. The triggers for the state transitions are either packet-level traces or networking system calls.

We use Galaxy S3 and S4 phones to illustrate the hybrid power modeling technique.

We determine the set of phone components to be modeled by measuring the maximal power draw of all the major components using micro-benchmarks one at a time, while keeping the load on other components steady. For example, to gauge the GPU power, we keep the CPU at a fixed frequency, and run the GPU benchmark app that performs 2D rendering. Based on these initial power measurements, we selected the set of components showing significant power draw, as shown in Table 1.

TABLE 1

Summary of power model for example device components.

| Hardware component power draw | Model Trigger |
| --- | --- |
| CPU | frequency + utilization |
| GPU | frequency + utilization |
| Screen | brightness level |
| WiFI | FSM + signal strength |
| 3G/LTE | FSM + signal strength |

We further confirm the components are largely independent—our model described below which assumes different components are independent and add up to the total power drain of the phone has an error less than 10%.

To accurately capture the power behavior of all the identified power-hungry components, we develop a hybrid utilization-based and FSM-based power model that achieves good modeling accuracy. In particular, we resort to utilization-based modeling to capture power behavior of CPU and GPU whose power draw depend on utilization, and we use FSM-based modeling for wireless interfaces such as WiFi/3G/LTE.

In summary, the triggers for modeling all the components are shown in Table 1.

CPU

As specified in the previous section, we used CPU microbenchmarks to obtain the relationship between the CPU power draw and CPU operating frequency and also devised a methodology for accounting for multiple cores running at different frequencies. For example, in training the power model for Galaxy S3, we first use power meter to measure the power draw of the CPU under different frequencies with only core-0 turned on. We then repeat the process with both cores turned on 2. Table 2 shows the CPU power draw at 100% CPU utilization for Galaxy S3 under a range of frequencies. Single-core results are shown with core-1 turned off.

In modeling the quad-core CPU on Galaxy S4, we follow the following procedure. The power draw of the quad-core CPU is modeled as:

$$P\_CPU = P\_\{B, Nc\} + \text{Sum}(u\_i * P\_(f\_i)), i=1, N\_c$$

where $N\_c$ is the number of CPU cores, $P\_\{PB;Nc\}$ is the baseline CPU power with Nc enabled cores, $P\_(f\_i)$ is the power increment of core i at frequency $f\_i$, and $u\_i$ is the core's utilization.

TABLE 2

Dual-core CPU power model for Galaxy S3, shown for 6 sample frequencies per core. The unit of CPU power is mW.

| | 384 MHz | | 1026 MHz | | 1890 MHz | |
|---|---|---|---|---|---|---|
| | $P_{B, N_c}$ | $P_\Delta (f_i)$ | $P_{B, N_c}$ | $P_\Delta (f_i)$ | $P_{B, N_c}$ | $P_\Delta (f_i)$ |
| 1 | 86 | 207 | 86 | 438 | 86 | 1358 |
| 2 | 269 | 70 | 363 | 228 | 647 | 811 |
| 3 | 351 | 72 | 464 | 239 | 917 | 891 |
| 4 | 472 | 75 | 577 | 243 | 1205 | 962 |

We first model the core-0 using the same method as with Galaxy S3. We then varied the number of cores online, but fix all online cores to the same frequency and 100% utilization. The increased power when turning on core-i is considered as the busy power for core-i at this frequency. Then we vary the frequency and repeat the process to obtain the busy power for each core at each frequency.

For idle power, the procedure is the same except we keep the online cores idle instead of 100% busy. Table 3 shows the CPU power draw at 100% CPU utilization for Galaxy S4 under a range of frequencies with varying number of online cores.

To use the CPU model for energy accounting of a synchronous function call, we use system utilities to log the frequencies of each core as well as the utilization of each app active during duration of the synchronous function call. In post-processing, we estimate the CPU power draw based on the logged CPU frequency and the synchronous function call's CPU utilization, i.e., as the power draw at that frequency under 100% utilization weighted by the function call's actual utilization. Finally, we integrate the power over the synchronous function call duration to derive the GPU energy drain of the synchronous function call.

TABLE 3

Galaxy S4 CPU power model for 3 sample frequencies with varying number of online cores. The power unit is mW.

| | Core 1 (MHz) | | | | | | |
|---|---|---|---|---|---|---|---|
| Core 0 (MHz) | 0 | 384 | 594 | 810 | 1026 | 1242 | 1512 |
| 384 | 296 | 744 | 766 | 818 | 873 | 977 | 1047 |
| 594 | 359 | 766 | 814 | 866 | 921 | 1036 | 1103 |
| 810 | 411 | 818 | 866 | 918 | 973 | 1080 | 1154 |
| 1026 | 455 | 873 | 921 | 977 | 1029 | 1136 | 1217 |
| 1242 | 555 | 981 | 1029 | 1084 | 1140 | 1199 | 1277 |
| 1512 | 633 | 1062 | 1106 | 1158 | 1221 | 1273 | 1351 |

Screen

To model the power draw of Galaxy S3/S4 which are both AMOLED screens, we derive a power model based on screen brightness and ignored screen content to reduce our overhead.

For example, Galaxy S3 and S4 phones have AMOLED screens, and thus in principle the screen power model should have two triggers: the brightness, and the content displayed on the screen.

However, logging the content will impose unacceptable performance overhead. Further, we compared screen power of 10 popular apps and games under typical brightness settings and found the screen power differ by less than 18.5% for different displayed contents. This is much lower than the 45.5% to 77.0% screen power draw difference between the lowest and highest brightness levels on the two devices (fixing the displayed content). For these two reasons, we strike a balance between model accuracy and logging overhead by deriving a screen model solely based on the brightness using the following method: we used a set of wallpapers with various color tones, ranging from the darkest (pure black) to the brightest (pure white), and for each wallpaper we measured the screen power draw under each brightness level. Finally, for each brightness level, we use the average power draw across all wallpapers as the screen power under this brightness value.

To use the screen power model for energy accounting of a synchronous function call, we log the screen brightness during the entire duration of the function call. We then predict the screen power draw based on the screen power model, and integrate the power over the function call duration to derive the total screen energy drain of the synchronous function call.

GPU

We develop a power model for GPU based on the different power states as well as accounting for the operating frequency during each state. The GPUs on both Galaxy S3 and S4 have three power states: Active, Nap and Idle, and can be in four different frequencies. Thus the GPU power draw in different power state and frequency combinations differ.

In GPU power modeling, we run GPU microbenchmarks to generate workload and in the meanwhile measure the power draw using the power meter. The measured power consists of three parts: CPU power, GPU power and screen power. Hence, we logged the frequency and utilization of CPUs, the frequency and state of GPU, as well as the brightness of the screen.

In post-processing, we first isolate the power draw of GPU by subtracting the CPU and screen power (calculated by the CPU and screen power models) from the total power, and then calculate the average GPU power draw under each frequency and state combination to obtain the GPU power model. Table 4 shows the GPU power draw for Galaxy S3 and S4 under each frequency and state. The power of Idle state is always 0 hence not shown.

TABLE 4

Galaxy S3 and S4 CPU power Models.

Galaxy S3

| Frequency (MHz) | 128 | 200 | 300 | 400 |
|---|---|---|---|---|
| Active power (mA) | 729 | 975 | 1217 | 1482 |
| Nap power (mA) | 78 | 0 | 0 | 78 |

TABLE 4-continued

Galaxy S3 and S4 CPU power Models.

Galaxy S4

| Frequency (MHz) | 128 | 200 | 320 | 450 |
|---|---|---|---|---|
| Active power (mW) | 293 | 398 | 562 | 1034 |
| Nap power (mW) | 0 | 0 | 0 | 164 |

To use the GPU power model for energy accounting of a synchronous function call, we log the duration of each GPU frequency and state combination every 1 second during the entire duration of the function call. We then predict the GPU power draw of each interval based on the GPU model, and integrate the power over the function call duration to derive the total GPU energy drain of the synchronous function call.

WiFi, 3G, LTE State Machine Models

WiFi, 3G, and LTE interfaces have multiple power states and the power draw and duration at the Active state is affected by the wireless signal strength. Further, we notice significant CPU power draw during pure data transfer workload, due to interrupt handling and TCP/IP stack processing, and therefore we need to carefully decouple CPU power draw from the wireless interface power draw in training the model.

Figure 4A:
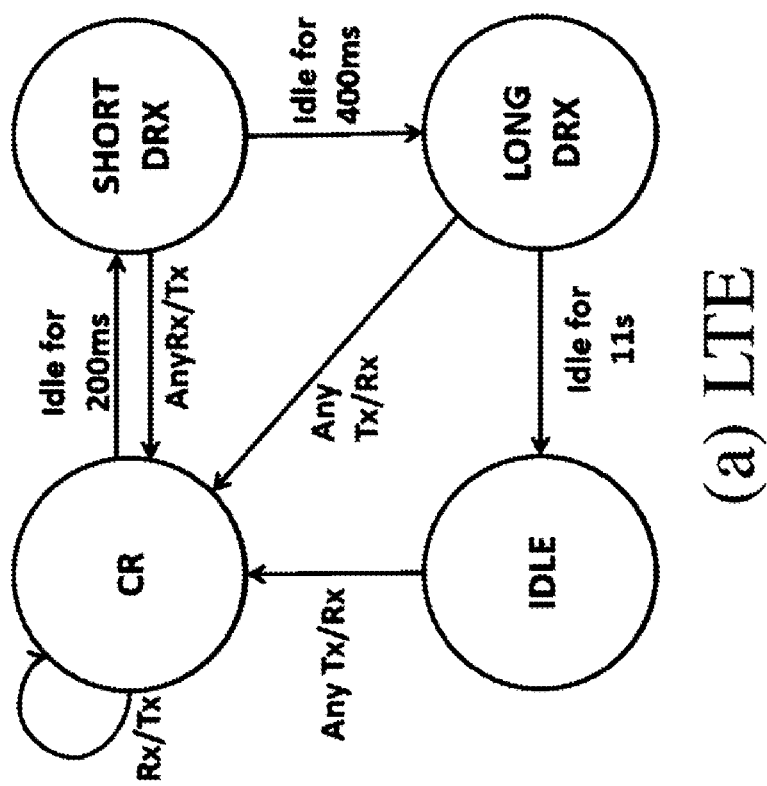
FIG. 4a is schematic of power states and their transitions for cellular connectivity (LTE) for a Galaxy S3 and S4.
Figure 5:
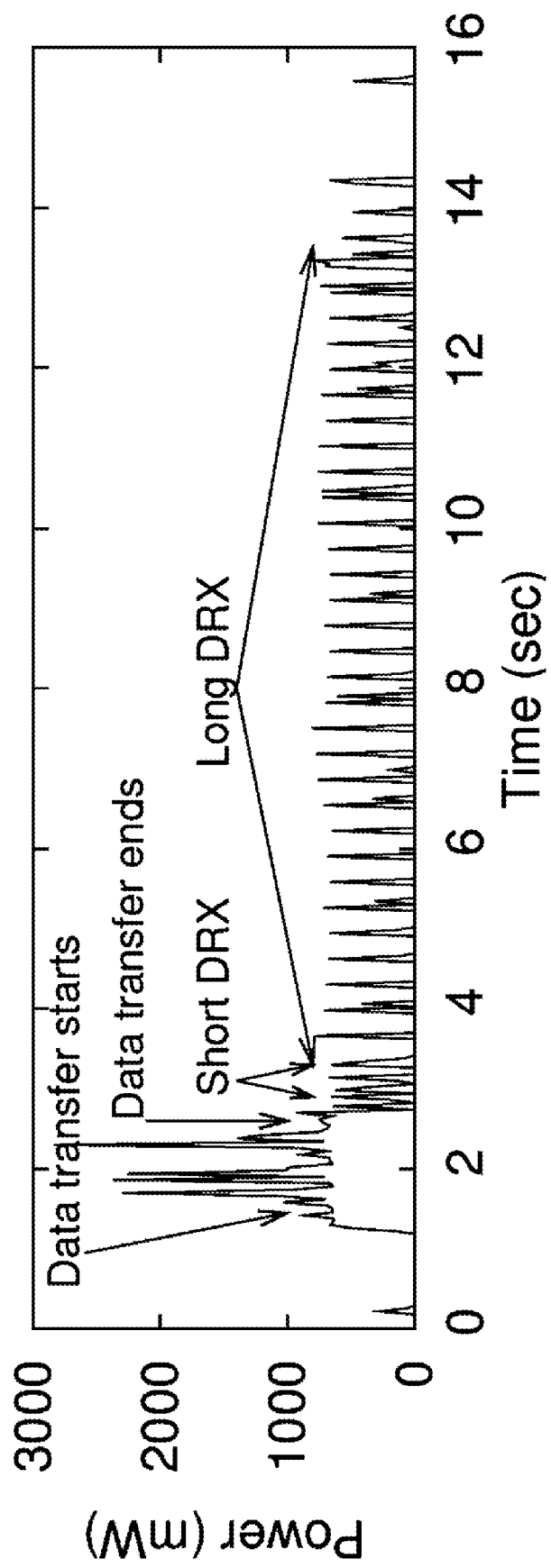
FIG. 5 is a graph of power in mW vs. Time in seconds depicting LTE power states for Galaxy S3.

The LTE interface on smartphones has four power states. The power states and their transitions are shown in FIG. 4a: (1) IDLE: The interface is in idle states when the User Equipment (UE) does not send or receive any data. The interface consumes little power under the IDLE state, and periodically wakes up to check whether there are incoming data buffered at the network. (2) CR: When the UE sends or receives any data, the interface enters the Continuous Reception (CR) state and consumes high power. (3) Short DRX: After the UE finishes data transfer and becomes idle for 200 ms, the interface will enter the Short DRX state, during which the interface consumes little power but wakes up frequently to check for incoming traffic. (3) Long DRX: The interface enters the Long DRX state after staying in Short DRX for 400 ms without receiving any data. Long DRX is similar to Short DRX except that the wakeup interval becomes longer. Note in the power model in Table 5 we refer the periodical spikes during Short DRX and Long DRX state as Short DRX and Long DRX, respectively, and refer the low base periods between spikes as LTE tail base, as shown in FIG. 5, which plots the LTE power states on Galaxy S3 during a 100 KB download under good signal strength (−90 dBm). Finally, if the UE stays in Long DRX for 11 seconds without receiving any data, the interface will return to the IDLE state; otherwise, any data sending or receiving in Short DRX or Long DRX states will trigger it to enter the CR state.

The 3G interface has three RRC states: IDLE, FACH and DCH, as well as transition states between RRC states.

Figure 4B:
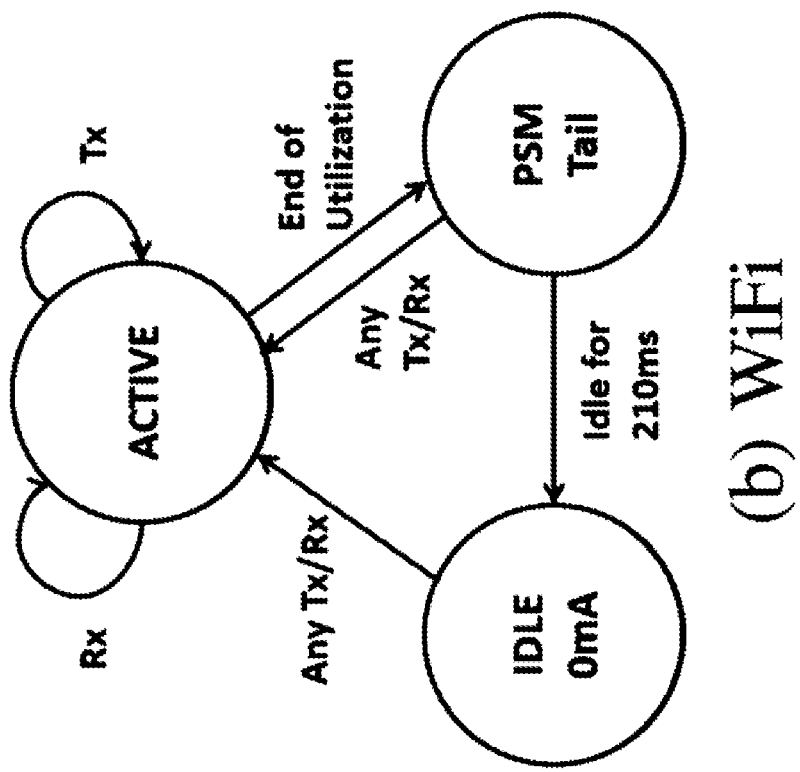
FIG. 4b is a schematic of power states and their transitions for WiFi operations for a Galaxy S3 and S4.

The WiFi interface also has four power states: Tx, Rx, Tail, and Idle, as shown in FIG. 4b. The interface is in the Idle state when there is no traffic, and will enter the Tx (Rx) state when it starts sending (receiving) data. After data transfer, the interface will stay in the Tail state for 210 ms before it returns to the Idle state. The interface consumes very little power in the Idle state, moderate power in the Tail state, and high power in the Tx and Rx states.

To develop signal-strength-aware power models for the wireless interfaces for our phone, we connect the phone to the power meter and run data transfer microbenchmarks. While the power meter collects the power profile, we use operating systems utilities for logging system calls such as strace to record all the network system calls, alongside signal strength values as well as CPU frequencies and the CPU utilization. We vary the signal strength received by the phone by adjusting the distance between the phone and the AP for WiFi experiments and changing the location of the phone for 3G/LTE experiments. In post-processing, we synchronize the power profile from the power meter, system call log and signal strength traces. We derive the power draw by the radio interface(s) by subtracting the CPU power from the total power. We infer the different power states of WiFi, 3G, LTE driven by the network system calls and derive the various parameters of the signal-strength-aware power state machine for each interface.

Tables 5 shows the WiFi and LTE power draw for Galaxy S3 and S4 under different signal strength.

TABLE 5

Parameters of signal-strength-aware power models for WiFi and LTE on Galaxy S3 and S4. The power unit is mW.

| | WiFi | | | | | |
|---|---|---|---|---|---|---|
| | Galaxy S3 | | | Galaxy S4 | | |
| RSSI (dBm) | Tx | Rx | Tail | Tx | Rx | Tail |
| −50 | 564 | 396 | 242 | 654 | 451 | 289 |
| −60 | 596 | 422 | 242 | 723 | 528 | 289 |
| −70 | 641 | 431 | 242 | 1019 | 592 | 289 |
| −80 | 704 | 400 | 242 | 1113 | 633 | 289 |
| −85 | 702 | 382 | 242 | 892 | 514 | 289 |

The duration of WiFi tail for both prones is 210 ms.

| | Galaxy S3 3G | | |
|---|---|---|---|
| | promotion | DCH tail | FACH tail |
| −85 | 836 mW, 1.6 s | 783 mW, 3.3 s | 486 mW, 6.7 s |
| −95 | 836 mW, 1.6 s | 1034 mW, 3.3 s | 486 mW, 6.7 s |
| −105 | 836 mW, 1.6 s | 1224 mW, 3.3 s | 486 mW, 6.7 s |

| | Galaxy S4 3G | | |
|---|---|---|---|
| | promotion | DCH tail | FACH tail |
| −85 | 647 mW, 2.1 s | 577 mW, 3.3 s | 332 mW, 1.7 s |
| −95 | 663 mW, 2.1 s | 679 mW, 3.3 s | 390 mW, 1.7 s |
| −105 | 807 mW, 2.2 s | 722 mW, 3.3 s | 390 mW, 1.7 s |

| | Galaxy S3 3G | | Galaxy S4 3G | |
|---|---|---|---|---|
| RSSI (dBm) | Tx (mW) | Rx (mW) | Tx (MW) | Rx (mW) |
| −85 | 1414 | 1300 | 667 | 843 |
| −95 | 1737 | 1718 | 835 | 1043 |
| −105 | 2280 | 2060 | 1772 | 1545 |

| GALAXY S3 LTE | | | |
|---|---|---|---|
| | Power (mW) | Duration (ms) | Periodicity (ms) |
| LTE promotion | 1200 | 200 | N/A |
| Short DRX | 788 | 41 | 100 |
| Long DRX | 788 | 45 | 320 |
| LTE tail base | 61 | 11000 | N/A |
| DRX in IDLE | 570 | 32 | 1280 |

| Galaxy S4 LTE | | | |
|---|---|---|---|
| | Power (mW) | Duration (ms) | Periodicity (ms) |
| LTE promotion | 1326 | 200 | N/A |
| Short DRX | N/A | N/A | N/A |
| Long DRX | 585 | 30 | 320 |
| LTE tail base | 69 | 11000 | N/A |
| DRX in IDLE | 452 | 24 | 1280 |

| | S3 LTE | | S4 LTE | |
|---|---|---|---|---|
| RSRP (dBm) | Tx (mW) | Rx (mW) | Tx (mW) | Rx (mW) |
| −85 | 1218 | 1085 | 1177 | 938 |
| −95 | 1683 | 1264 | 1849 | 1110 |
| −105 | 1840 | 1271 | 1699 | 1140 |

To use the WiFi/3G/LTE power model for energy accounting of a synchronous function call, we use system utilities to log the network system calls during the duration of the synchronous function call. In post-processing, we estimate the network interface power draw based on the logged network system calls and the network interface FSA power model. Finally, we integrate the power draw over the function call duration to derive the total network energy drain of the synchronous function call.

Finally, the total component energy drain of the synchronous function call, e.g., for CPU, GPU, WiFi/LTE/3G, and screen are added as the total energy drain of the synchronous function call.

The present disclosure has been described in detail with particular reference to certain preferred aspects thereof, but it will be understood that variations, combinations, and modifications can be effected by a person of ordinary skill in the art within the spirit and scope of the invention.

The invention claimed is:

1. A method for profiling energy usage of invoking an application programming interface (API) by an application in a computing device, comprising:
    obtaining source code "A" for an API Ai;
    instrumenting the source code A to generate and associate a unique callback function identification with each callback function that is executed asynchronously and to log the callback function identification associated with the callback function;
    obtaining source code B responsible for asynchronously executing callback functions in a callback queue;
    instrumenting the source code B to insert logging function to log the time and the callback function identification before and after a callback function execution;
    executing the instrumented source code A with the instrumented source code B;
    determining which API requested a callback function and when the callback function was asynchronously executed based on the logged callback function identification; and
    determining the energy usage of calling the API Ai.

2. The method of claim 1, wherein the callback function is associated with a class in object-oriented programming and the instrumentation of the source code A includes:
    identifying each class $C_i$ in the source code A for the API $A_i$ that contains a callback function $D_i$;
    modifying each class $C_i$ by adding a callback function identifier (ID) field that is initiated to a unique value Vj upon instantiation of each object Oj that belongs to class $C_i$;
    identifying each location $E_k$ in the source code A that posts the callback function $D_i$, for asynchronous execution by enqueueing object $O_j$ instantiated from the class $C_i$, containing the callback function $D_i$, into the callback queue; and
    modifying the source code A at location $E_k$ by adding a logging function call L to log the callback function ID $V_j$ and current call stack into an energy profiling log.

3. The method of claim 1, wherein the callback function is associated with a class in object-oriented programming and the instrumentation of the source code B includes:
    identifying each location F in the source code B that invokes the callback function associated with any object dequeued from the callback queue; and
    modifying the source code B at the location F by calling logging functions L before and after the callback function invocation to log the time and the callback function identifier of the dequeued object into the energy profiling log.

4. The method of claim 1, wherein the callback function is not associated with a class in object-oriented programming and the instrumentation of the source code A includes:
    identifying each callback function $D_i$, in the source code A for the API $A_i$, that will be posted by the API $A_i$;
    modifying the source code A by adding a callback function identifier (ID) variable $C_i$, that is initiated to a unique value $V_i$ and creating a data structure that associates the callback function ID variable $C_i$, with the callback function $D_i$,
    identifying each location $E_k$ in the source code A that posts the callback function $D_i$, for asynchronous execution by enqueueing a pair of values containing a reference to the callback function $D_i$ and the corresponding callback function ID value $V_j$ into the callback queue; and
    modifying the source code A at location $E_k$ by adding a logging function call L to log the callback function ID value $V_j$ and current call stack into an energy profiling log.

5. The method of claim 1, wherein the callback function is not associated with a class in object-oriented programming and the instrumentation of the source code B includes:
    identifying each location F in the source code B that invokes the callback function associated with any pair of callback function reference and callback function ID dequeued from the callback queue; and
    modifying the source code B at the location F by calling logging functions L before and after the callback function invocation to log the time and the callback function ID associated with the executed callback function into the energy profiling log.

6. The method of claim 1, wherein the execution of the instrumented source code A with the instrumented source code B includes:
    executing the application thereby generating a first thread and a second thread, wherein the first thread executes a call to the API $A_i$ that posts the callback function $D_i$ and wherein the second thread i) dequeues the callback function $D_i$, and ii) invokes the callback function $D_1$.

7. The method of claim 1, wherein the determination of which API requested the callback function includes:
    determining the caller-callee relationship between the API $A_i$ (caller) that posted $D_i$, and the corresponding asynchronous invocation of $D_i$ (callee), by matching the logged callback function IDs in the energy profiling log.

8. The method of claim 1, wherein the determination of the energy usage of calling the API Ai includes:
    determining the energy usage of the execution of callback function $D_i$ in thread 2;
    determining the energy usage of invoking the API $A_i$ call in thread 1; and
    adding the energy usage of executing callback function $D_i$ in thread 2 to the energy usage of invoking the API $A_i$ in thread 1.

9. The method of claim 6, wherein determining the energy usage of executing a function comprises monitoring the activities of any component that consumes power in the computing device in response to executing the function.

10. A computing device, comprising:
    a memory adapted to store program data;
    a processor operatively coupled to the memory and configured to profile energy usage of invoking an application programming interface (API) by an application in a computing device, the energy profiling by the processor includes:
execute source code "A" for an API $A_i$, wherein the source code A is instrumented to generate and associate a unique callback function identification with each callback function that is executed asynchronously and to log the callback function identification associated with the callback function;
execute source code B responsible for asynchronously executing callback functions in a callback queue, wherein the source code B is instrumented to insert logging function to log the time and the callback function identification before and after a callback function execution;
determine which API requested a callback function and when the callback function was asynchronously executed based on the logged callback function identification; and
determine the energy usage of calling the API $A_i$.

11. The computing device of claim 10, wherein the callback function is associated with a class in object-oriented programming and the instrumentation of the source code A includes:
identifying each class $C_i$ in the source code A for the API $A_i$ that contains a callback function $D_i$;
modifying each class $C_i$ by adding a callback function identifier (ID) field that is initiated to a unique value Vj upon instantiation of each object Oj that belongs to class $C_i$;
identifying each location $E_k$ in the source code A that posts the callback function $D_i$ for asynchronous execution by enqueueing object $O_j$ instantiated from the class $C_i$ containing the callback function $D_i$ into the callback queue; and
modifying the source code A at location $E_k$ by adding a logging function call L to log the callback function ID $V_j$ and current call stack into an energy profiling log.

12. The computing device of claim 10, wherein the callback function is associated with a class in object-oriented programming and the instrumentation of the source code B includes:
identifying each location F in the source code B that invokes the callback function associated with any object dequeued from the callback queue; and
modifying the source code B at the location F by calling logging functions L before and after the callback function invocation to log the time and the callback function identifier of the dequeued object into the energy profiling log.

13. The computing device of claim 10, wherein the callback function is not associated with a class in object-oriented programming and the instrumentation of the source code A includes:
identifying each callback function $D_i$ in the source code A for the API $A_i$ that will be posted by the API $A_i$;
modifying the source code A by adding a callback function identifier (ID) variable $C_i$ that is initiated to a unique value $V_i$ and creating a data structure that associates the callback function ID variable $C_i$ with the callback function $D_i$, identifying each location $E_k$ in the source code A that posts the callback function $D_i$ for asynchronous execution by enqueueing a pair of values containing a reference to the callback function $D_i$ and the corresponding callback function ID value $V_j$ into the callback queue; and
modifying the source code A at location $E_k$ by adding a logging function call L to log the callback function ID value $V_j$ and current call stack into an energy profiling log.

14. The computing device of claim 10, wherein the callback function is not associated with a class in object-oriented programming and the instrumentation of the source code B includes:
identifying each location F in the source code B that invokes the callback function associated with any pair of callback function reference and callback function ID dequeued from the callback queue; and
modifying the source code B at the location F by calling logging functions L before and after the callback function invocation to log the time and the callback function ID associated with the executed callback function into the energy profiling log.

15. The computing device of claim 10, wherein the execution of the instrumented source code A with the instrumented source code B includes:
executing the application thereby generating a first thread and a second thread, wherein the first thread executes a call to the API $A_i$ that posts the callback function $D_i$ and wherein the second thread i) dequeues the callback function $D_i$, and ii) invokes the callback function $D_i$.

16. The computing device of claim 10, wherein the determination of which API requested the callback function includes:
determining the caller-callee relationship between the API $A_i$ (caller) that posted $D_i$, and the corresponding asynchronous invocation of $D_i$ (callee), by matching the logged callback function IDs in the energy profiling log.

17. The computing device of claim 10, wherein the determination of the energy usage of calling the API $A_i$ includes:
determining the energy usage of the execution of callback function $D_i$ in thread 2;
determining the energy usage of invoking the API $A_i$ call in thread 1; and
adding the energy usage of executing callback function $D_i$ in thread 2 to the energy usage of invoking the API $A_i$ in thread 1.

18. The computing device of claim 17, wherein determining the energy usage of executing a function comprises monitoring the activities of any component that consumes power in the computing device in response to executing the function. device in response to executing the function.

* * * * *